(12) United States Patent
Akiyama

(10) Patent No.: US 6,909,832 B2
(45) Date of Patent: Jun. 21, 2005

(54) OPTICAL FIBER RIBBON SPLITTING TOOL AND OPTICAL FIBER RIBBON SPLITTING METHOD

(75) Inventor: Tomohiro Akiyama, Tokyo (JP)

(73) Assignee: The Furukawa Electric Co., Ltd. (JP)

( * ) Notice: Subject to any disclaimer, the term of this patent is extended or adjusted under 35 U.S.C. 154(b) by 54 days.

(21) Appl. No.: 10/414,323

(22) Filed: Apr. 15, 2003

(65) Prior Publication Data

US 2003/0194194 A1 Oct. 16, 2003

(30) Foreign Application Priority Data

Apr. 15, 2002 (JP) ......................................... 2002-112006

(51) Int. Cl.⁷ ............................................... G02B 6/00
(52) U.S. Cl. ....................................................... 385/134
(58) Field of Search .................................. 385/134–137

(56) References Cited

U.S. PATENT DOCUMENTS 6,053,085 A * 4/2000 Lochkovic et al. ........... 83/618

* cited by examiner

Primary Examiner—Javaid H. Nasri
(74) Attorney, Agent, or Firm—Cantor Colburn LLP

(57) ABSTRACT

An optical fiber ribbon splitting tool that accommodates an optical fiber ribbon in guide groove portion and splits longitudinally the accommodated optical fiber ribbon, where a cross section of the guide groove portion comprises a bottom portion with a width slightly smaller than a width of an optical fiber ribbon to be split, and side wall portions each composed of a straight-slant surface tilting so that a groove width becomes narrower as closer to the bottom portion from an opening portion in the guide groove portion.

15 Claims, 9 Drawing Sheets

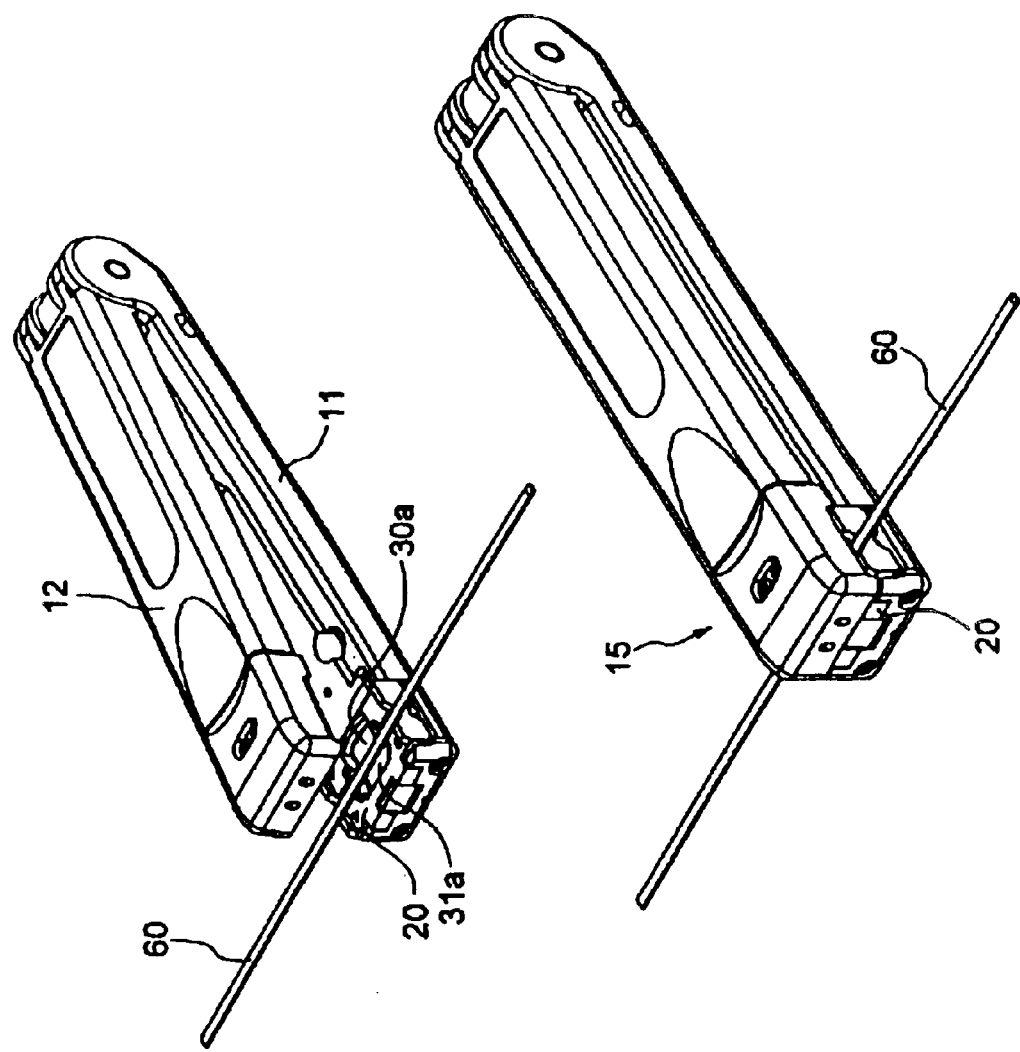

OPTICAL FIBER RIBBON SPLITTING TOOL AND OPTICAL FIBER RIBBON SPLITTING METHOD

FIELD OF THE INVENTION

The present invention relates to an optical fiber ribbon splitting tool (hereinafter, simply referred to as a "splitting tool", except in particular limitation) and optical fiber ribbon splitting method for mechanically splitting longitudinally an optical fiber ribbon.

RELATED ART

An optical fiber ribbon is split when the optical fiber ribbon is removed and each optical fiber conductor is connected in carrying out post-branch-connection of optical fiber cable or in branching the optical routing in an optical apparatus such as an optical amplifier. In such cases, in order to mechanically split an optical fiber ribbon while preventing damage to the optical fiber conductor, it is important to precisely align a splitting edge provided in a splitting tool with the optical fiber optical fiber ribbon.

In conventional splitting tools, an optical fiber ribbon is set along a guide groove provided in the splitting tool, thereby aligning a splitting edge for use in splitting with the optical fiber ribbon. Generally, the guide groove is integrally formed with the splitting tool, and has a size adapted to a width and height of the optical fiber ribbon. Further, in order to prevent the optical fiber ribbon from going out of the guide groove, the optical fiber ribbon is pressed against a bottom of the guide groove by a cover or a dedicated pressing piece to keep the alignment.

Splitting methods are broadly divided into three methods. In a first one, a splitting edge or needle-shaped cutting edge is inserted into a splitting position, and an optical fiber ribbon is moved in a splitting direction and thereby is split. In a second one an optical fiber ribbon is given a cut on its surface with, for example, a needle, subsequently given a shear stress with a splitting piece, and split by the shear stress using the cut as a trigger. In a third one, with an optical fiber ribbon pinched, a splitting piece is moved in a splitting direction and thereby splits the optical fiber ribbon by shearing. In either method, a guide groove portion is provided to position an optical fiber ribbon so that the optical fiber ribbon is placed in a predetermined position.

However, optical fiber ribbons to be split by a splitting tool have specified fluctuation in size within a range of production error allowed in standards. Therefore, in conventional splitting tools, a groove width of the guide groove portion that accommodates an optical fiber ribbon in splitting has a size capable of accommodating an optical fiber ribbon with a maximum width allowable in standards.

In such conventional splitting tools, when an optical fiber ribbon is smaller in width than the standard maximum size, since a gap appears between the optical fiber ribbon and side walls of the guide groove and thus prevents the precise alignment in splitting, there arises a case that the fluctuations in production size of optical fiber ribbon prevent satisfactory splitting.

Further, optical fiber ribbons have various types such as 2-fiber, 4-fiber and 8-fiber. However, in the conventional splitting tools, since the guide groove is integrally formed with a splitting tool, a single splitting tool is for use in splitting a single type of optical fiber ribbon, and therefore, it has been required to prepare splitting tools for each type of optical fiber ribbon at worksites.

Furthermore, splitting by shearing using a splitting piece has a problem that the shear stress applied in splitting causes a pressed optical fiber ribbon to extend and sag. This case will be described with reference to FIGS. 9A and 9B. FIG. 9A is a conceptual view to explain effects of shear splitting in the conventional technique. First, lower and upper fixed pieces (fixed members) 62a and 62b, and lower and upper movable pieces (movable members) 63a and 63b hold portions in width of an optical fiber ribbon at the same height. Then, by moving only the movable pieces 63a and 63b either upwardly or downwardly, the optical fiber ribbon is split by shear stress.

In FIG. 9A the movable pieces 63a and 63b are moved upwardly. Thus, when only the movable pieces 63a and 63b are moved upwardly, as shown in FIG. 9B, a portion sandwiched between the movable pieces 63a and 63b extends and thereby causes sag 66. Therefore, the optical fiber ribbon split into two has the one side 66 with the sag and the other side 65 with no sag. The conventional technique has a problem that thus generated sag 66 causes the torsion in the optical fiber ribbon and that satisfactory slitting is not obtained.

SUMMARY OF THE INVENTION

An optical fiber ribbon splitting tool according to a first embodiment of the present invention is an optical fiber ribbon splitting tool that accommodates an optical fiber ribbon in a guide groove portion and splits longitudinally an accommodated optical fiber ribbon, wherein a cross section of said guide groove portion comprises a bottom portion with a width slightly smaller than a width of the optical fiber ribbon to be split, and side wall portions each composed of a straight-slant surface tilting in such a manner that a groove width becomes narrower as closer to said bottom portion from an opening portion in said guide groove portion.

In an optical fiber ribbon splitting tool according to another embodiment of the present invention, the width of said bottom portion of said guide groove portion is smaller than a standardized minimum width of an optical fiber ribbon, and said slant surface of each of said side wall portions has an angle smaller than 90° to said bottom portion.

In an optical fiber ribbon splitting tool according to another embodiment of the present invention, a width x of said bottom portion of said guide groove portion is smaller than a value determined from Equation (1) described below:

$$x = Wa - 2\left(\frac{t}{2} - \frac{t}{2}\tan\left(\frac{\beta}{2}\right)\right) \quad [\text{Eq. 1}]$$

where the standardized minimum width of an optical fiber ribbon is Wa, a thickness of the optical fiber ribbon is t, and the angle of said slant surface of each of said side wall portions is β.

In an optical fiber ribbon splitting tool according to another embodiment of the present invention, a depth y of said guide groove portion is determined from Equation (2) described below:

$$y = \frac{Wb - Wa}{2} \times \tan\beta + t \quad [\text{Eq. 2}]$$

where a standard maximum width in an optical fiber ribbon is Wb, the standardized minimum width is Wa, a thickness of the optical fiber ribbon is t, and the angle of said slant surface of each of said side wall portions is β.

An optical fiber ribbon splitting tool according to another embodiment of the present invention is an optical fiber ribbon splitting tool that splits longitudinally an optical fiber ribbon, said tool comprising:

a guide member which is separable from said splitting tool and has a guide groove portion that accommodates the optical fiber ribbon and an attachment engaging portion; and a guide attachment portion which is provided in said splitting tool, engages in said attachment engaging portion of said guide member and thereby fixes said guide member to said splitting tool in an exchangeable manner.

In an optical fiber ribbon splitting tool according to another embodiment of the present invention, said guide member has a cut portion formed crossing over a part of said guide groove portion which separates said guide groove portion into two portions, and when said guide member is attached and fixed to said splitting tool, a shear splitting portion that splits said optical fiber ribbon is accommodated in said cut portion.

An optical fiber ribbon splitting tool according to another embodiment of the present invention is an optical fiber ribbon splitting tool that sandwiches an optical fiber ribbon vertically and splits the optical fiber ribbon by shear stress along a longitudinal direction, said tool comprising:

guide groove portion that accommodate the optical fiber ribbon to be split; and a shear splitting portion comprising a pair of fixed members which are vertically provided in a cut portion formed so as to separate said guide groove portion into two portions and sandwich vertically therebetween a part of the optical fiber ribbon in a width direction at a position lower than a bottom portion of said guide groove portion and hold said optical fiber ribbon at said position, and a pair of movable members which are vertically provided adjacent to said fixed members in said cut portion, sandwich vertically therebetween a remaining part of the optical fiber ribbon in a width direction at the same position as said fixed members to be held, and when pressed by force more than a predetermined level, move upwardly while holding said part of the optical fiber ribbon in the width direction.

In an optical fiber ribbon splitting tool according to another embodiment of the present invention, at least upper fixed member of said pair of fixed members and at least upper movable member of said pair of movable members have respective curved surfaces each with a convex-shaped cross section projecting downwardly.

An optical fiber ribbon splitting method according to the first embodiment of the present invention is a method of mechanically splitting longitudinally part of an optical fiber ribbon, and comprises the steps of (a) sandwiching the optical fiber ribbon and thereby applying a stress in one direction so as to provide a portion of the optical fiber ribbon to be split by shearing with a sag portion in said one direction; and (b) applying a shear stress in a direction opposed to said one direction to the portion of the optical fiber ribbon with the sag portion provided, and splitting a part of the optical fiber ribbon in a width direction by shearing.

BRIEF DESCRIPTION OF THE DRAWINGS

FIG. 2A is a perspective view showing an optical fiber ribbon set in a guide groove portion of the splitting tool 10;

FIG. 2B is a perspective view showing the optical fiber ribbon sandwiched between the first member and second member of the splitting tool 10;

DETAILED DESCRIPTION OF THE INVENTION

An object of the present invention is to provide an optical fiber ribbon splitting tool capable of precisely splitting an optical fiber ribbon.

In view of problems with the conventional technique, another object of the present invention is to provide an optical fiber ribbon splitting tool in which an optical fiber ribbon can be accurately positioned in a guide groove portion even if the size of the optical fiber ribbon varies within a certain scope.

Further, another object of the present invention is to provide an optical fiber ribbon splitting tool in which the guide groove portion can be separated from the tool body and be replaced by other guide groove portion.

Furthermore, another object of the present invention is to provide an optical fiber ribbon splitting tool and method causing no sag in a sheared portion when splitting an optical fiber ribbon by shearing.

In the present invention, in a cross section, a width of a bottom portion of a guide groove is made smaller than a standard minimum value of a width of an optical fiber ribbon, and side wall portions are provided symmetrically to tilt so that the width of the guide groove becomes narrower as closer to the bottom portion, whereby the optical fiber ribbon can be positioned in a center portion of the guide groove. Further, by providing a guide member in which the guide groove portion can be separated and be replaced, and an attachment portion provided in a main body of the splitting tool, it is possible to exchange the guide groove portion corresponding to various types of optical fiber ribbons required. Further, a convex-shaped sag portion protruding in one direction is formed in one portion of an optical fiber ribbon, and a shear stress is applied in the direction opposed to the direction the sag formed, thereby splitting the optical fiber ribbon, while preventing the torsion in the optical fiber ribbon from being formed.

Figures 1A, 1B:
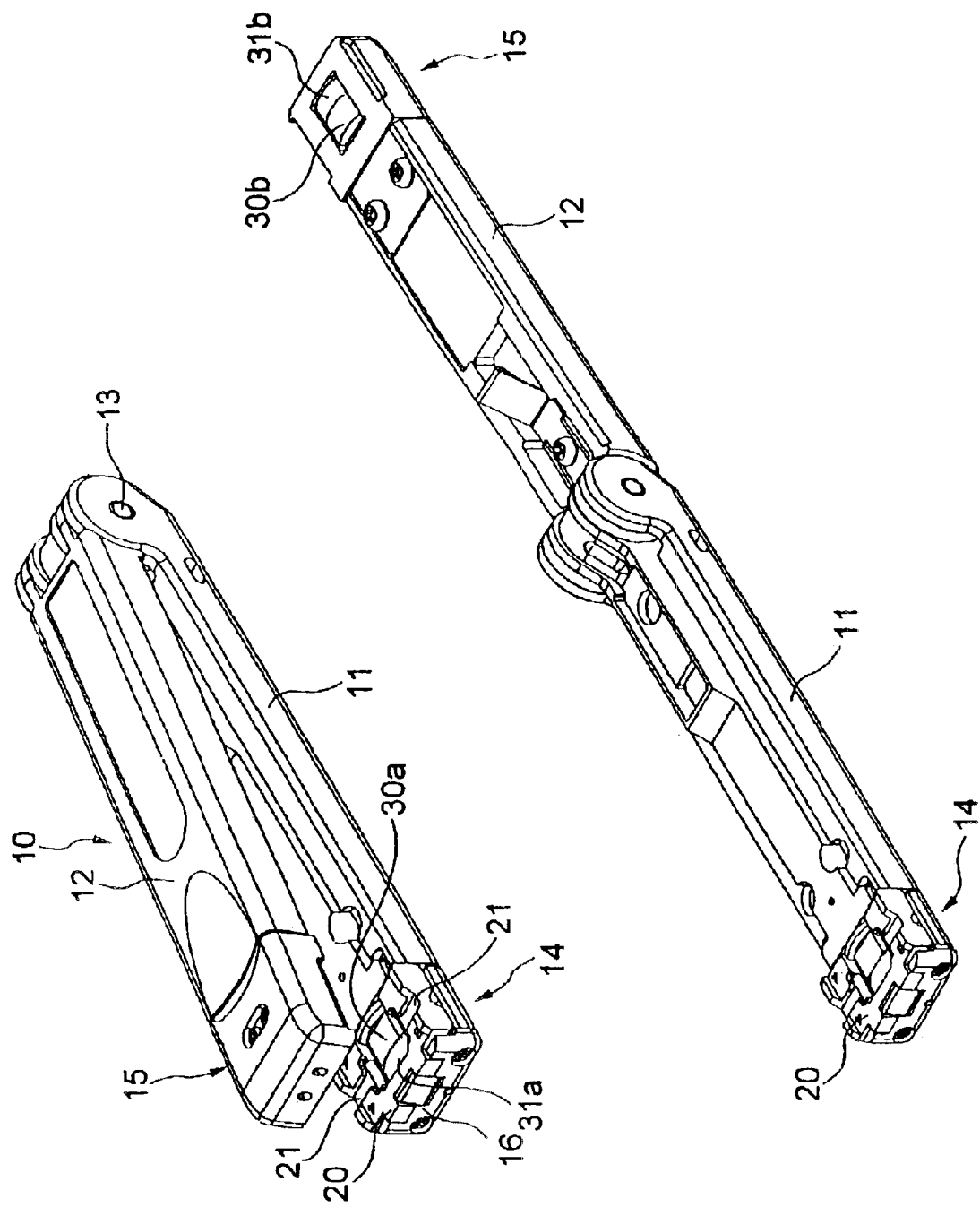
FIG. 1A is a perspective view, showing a general state of an optical fiber ribbon splitting tool 10 according to one embodiment of the present invention.
FIG. 1B is a perspective view showing the optical fiber ribbon splitting tool 10 with a first member 11 and second member 12 opened at a 180-degree angle.

Embodiments of the optical fiber ribbon splitting tool of the present invention will be described with reference to accompanying drawings. FIG. 1A is a perspective view showing an optical fiber ribbon splitting tool 10 in a general state according to one embodiment of the present invention, and FIG. 1B is a perspective view showing the optical fiber ribbon splitting tool 10 with a first member 11 and a second member 12 fixed so as to be opened at a 180-degree angle. The first member 11 and the second member 12 are connected in their one end portions to an axis member 13 in such manner as to rotate on the axis member 13, and thereby they come into contact with each other in other end portions 14 and 15 thereof.

In the front end portion 14 of the first member 11, a guide member 20 is attached onto a guide attachment portion 16. The guide member 20 is provided with guide groove portion 21 extending leftward and rightward viewed in the figure. A cut portion is formed at a center portion of the guide member which separates the guide groove portion into two portions. In the cut portion there are provided a fixed member 30a and a movable member 31a which compose a part of a shear portion to split an optical fiber ribbon. As shown in FIG. 1B, at the front portion 15 of the second member 12 are also provided a fixed member 30b and a movable member 31b. The shear portion to split an optical fiber ribbon is composed of a pair of the fixed members 30a and 30b and a pair of the movable members 31a and 31b, which are vertically provided respectively.

In the splitting, an optical fiber ribbon is set in the guide groove portion 21. FIGS. 2A and 2B are perspective views showing an optical fiber ribbon set in the guide groove portion 21. As shown in FIG. 2A, an optical fiber ribbon 60 is first set in the guide groove portion 21. Then, as shown in FIG. 2B, the first member 11 and the second member 12 are bought into contact with each other to sandwich the optical fiber ribbon.

In this state, a part of the optical fiber ribbon in the width direction is sandwiched and held between the pair of the fixed members 30a and 30b. Since the pair of the fixed members 30a and 30b are respectively fixed to the first member 11 and second member 12, the members 30a and 30b do not move any more even when pressed by a stronger force. Meanwhile, with the first member 11 and second member 12 in contact with each other, the remaining part of the optical fiber ribbon in the width direction is sandwiched between the pair of the movable members 31a and 31b, and held at the same portion (height) as that of the part held by the fixed members. Since the pair of the movable members 31a and 31b are configured to move upwardly (the detail thereof will be described later), when pressing the movable members 31a and 31b by a predetermined force in this state, the movable members 31a and 31b move upwardly while holding the above mentioned remaining part of the optical fiber ribbon. A shear stress is thus applied to the optical fiber ribbon 60, and the optical fiber ribbon is thereby split. Subsequently, corresponding to a length to split, the optical fiber ribbon 60 and splitting tool 10 are relatively moved in a longitudinal direction of the optical fiber ribbon 60. In this way, it is possible to split the optical fiber ribbon 60 by a desirable length.

(Configuration of the Guide Groove Portion)

Figure 3A:
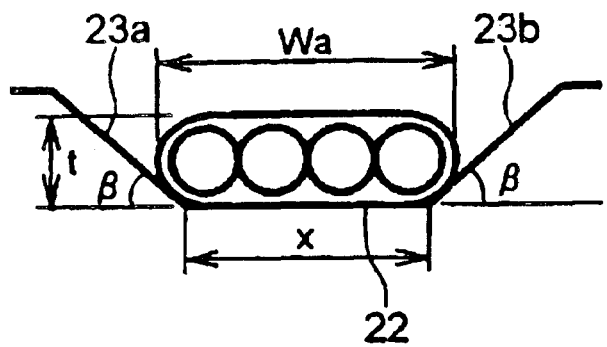
FIGS. 3A, 3B and 3C are conceptual views to explain a configuration of the guide groove portion of the present invention.
Figure 3B:
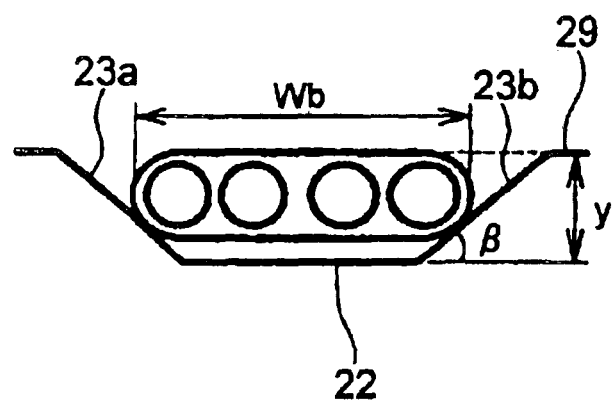

A configuration of the guide groove portion 21 of the present invention will be described with reference to FIGS. 3A, 3B and 3C. FIGS. 3A and 3B show schematic views to explain a cross sectional shape of the guide groove portion 21 of the present invention. FIG. 3A shows a case in which an optical fiber ribbon has a standard minimum value in width, and FIG. 3B shows a case in which an optical fiber ribbon has a standard maximum value in width. As shown in FIGS. 3A and 3B, in the present invention, a width x of the bottom portion 22 is made smaller than the standard minimum width of the optical fiber ribbon 60, while side wall portions 23a and 23b symmetrically tilt (each at an angle d), thereby eliminating the play for positioning required by production errors of the optical fiber ribbon 60, and improving the accuracy in positioning. In other words, at least left and right side faces of the optical fiber ribbon 60 always keep contact with side wall portions 23a and 23b, respectively.

More specifically, although the positions where the left and right side faces of an optical fiber ribbon are in contact with side wall portions 23a and 23b vary corresponding to the curbed shape (such as a radius of curvature) of the side face of the optical fiber ribbon 60, the optical fiber ribbon 60 is in contact with the guide groove portion 21 in at least one point of each of its left and right sides. In this way, the optical fiber ribbon is supported in the guide groove portion 21 in at least two points in the right and left sides thereof, which eliminates the play in right and left sides. Further, the angles β of right and left side walls are made the same, the optical fiber ribbon is thereby positioned with reference to the center of the guide groove portion 21, and it is thus possible to perform accurate positioning with reference to the center of the guide groove portion 21.

How to determine a width of the bottom portion 22 will be described. It is assumed as a premise that a minimum width allowed in standards is Wa, each side face of an optical fiber ribbon is in the form of a semicircle with a diameter t that is the thickness of the optical fiber ribbon, and that an angle of each of the side wall portions 23a and 23b is β(0<β<90°). In this case, it is preferable that a width x of the bottom portion 22 of the guide groove portion 21 is less than or equal to a value determined by following equation (1).

$$x = Wa - 2\left(\frac{t}{2} - \frac{t}{2}\tan\left(\frac{\beta}{2}\right)\right) \quad \text{(Eq. 1)}$$

When the width of the bottom portion 22 is a larger than the value determined by the equation (1), the optical fiber ribbon 60 with a width of the standard minimum value may cause to bring a case in which the side faces of the optical fiber ribbon 60 do not come into contact with either of the side wall portions 23 and 23b, and in such a case it is not possible to determine the position of the optical fiber ribbon 60. Therefore, it is preferable to make the width of the bottom less than or equal to the value determined by the equation (1). As is apparent from the equation (1), the width x of the bottom portion varies with the angle β. As a matter of fact, when the angle β is too small, it is not possible to define a lateral position of the optical fiber ribbon by the side wall portions 23a and 23b, on the other hand, when the angle is too close to 90°, the slant side wall portions 23 and 23b cannot absorb production errors of the optical fiber ribbon. Therefore, the angle d is determined by a difference between the maximum and minimum values of allowable production error in the standards and elements such as the friction between the side wall and optical fiber ribbon, and preferably is in a range from 30° to 80° (30°<β<80°), in general.

Further, in a configuration comprising a small bottom portion 22 and slant side wall portions 23a and 23b, when a depth of the guide groove portion 21 is shallow, setting an optical fiber ribbon with a wide width may cause an upper face of the optical fiber ribbon to project from the guide groove portion 21. In order to prevent such projection, how to determine a depth of the guide groove portion 21 will be described below.

FIG. 3B shows a depth y of the groove such that the height of an upper face 29 of the guide groove portion 21 is the same as the height of a set optical fiber ribbon with a maximum width allowable in the standards. The depth y is calculated by the following equation (2):

$$y = \frac{Wb - Wa}{2} \times \tan\beta + t \quad \text{(Eq. 2)}$$

where a maximum width of an optical fiber ribbon allowable in standards is Wb, an angle of each of the side wall portions 23a and 23b is β, and a thickness of the optical fiber ribbon is t.

The depth y of the guide groove portion 21 is affected by the angle d of each of the side wall portions 23a and 23b and a production error of Wa-Wb, as well as the width x of the bottom portion 22. As the value of Wa-Wb or the angle β becomes larger, the depth y is required to be larger.

For example, a width of 4-fiber optical fiber ribbon in JIS (Japanese Industrial Standards: JIS C6838) is 1.1±0.12 mm, and therefore, the standard minimum width is 0.98 mm while the standard maximum width is 1.22 mm. Assuming the angle β is 45°, and the thickness t is 0.3 mm, for example, obtains following values from the equations (1) and (2):

x=0.98−2((0.3/2)−(0.3/2)tan(45/2))=0.804 mm y=(1.22−0.98)/2×tan 45+0.3=0.42 mm

Figure 3C:
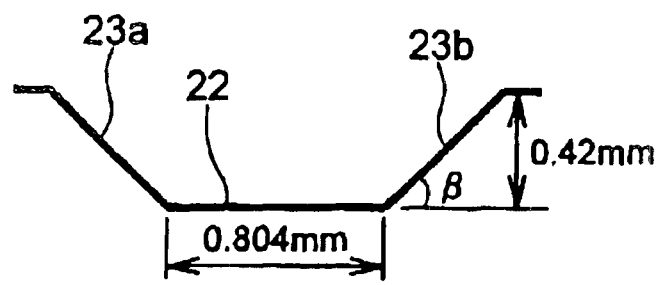

In other words, as shown in FIG. 3C, when the guide groove portion is formed with an angle of each of side wall portions of 45°, a width of the bottom portion of 0.804 mm and a depth of 0.42 mm enables the guide groove portion to precisely accommodate therein a 4-fiber optical fiber ribbon complying with JIS without moving sideward.

As described above, the respective side wall portions 23a and 23b of the guide groove portion 21 are formed to be slant-flat surfaces by processing the fine portion having a depth of 0.4 mm. Specifically, the chamfering working on each side wall portion allows the side wall portion to tilt at a predetermined angle.

(Guide Member)

Figures 4A, 4B:
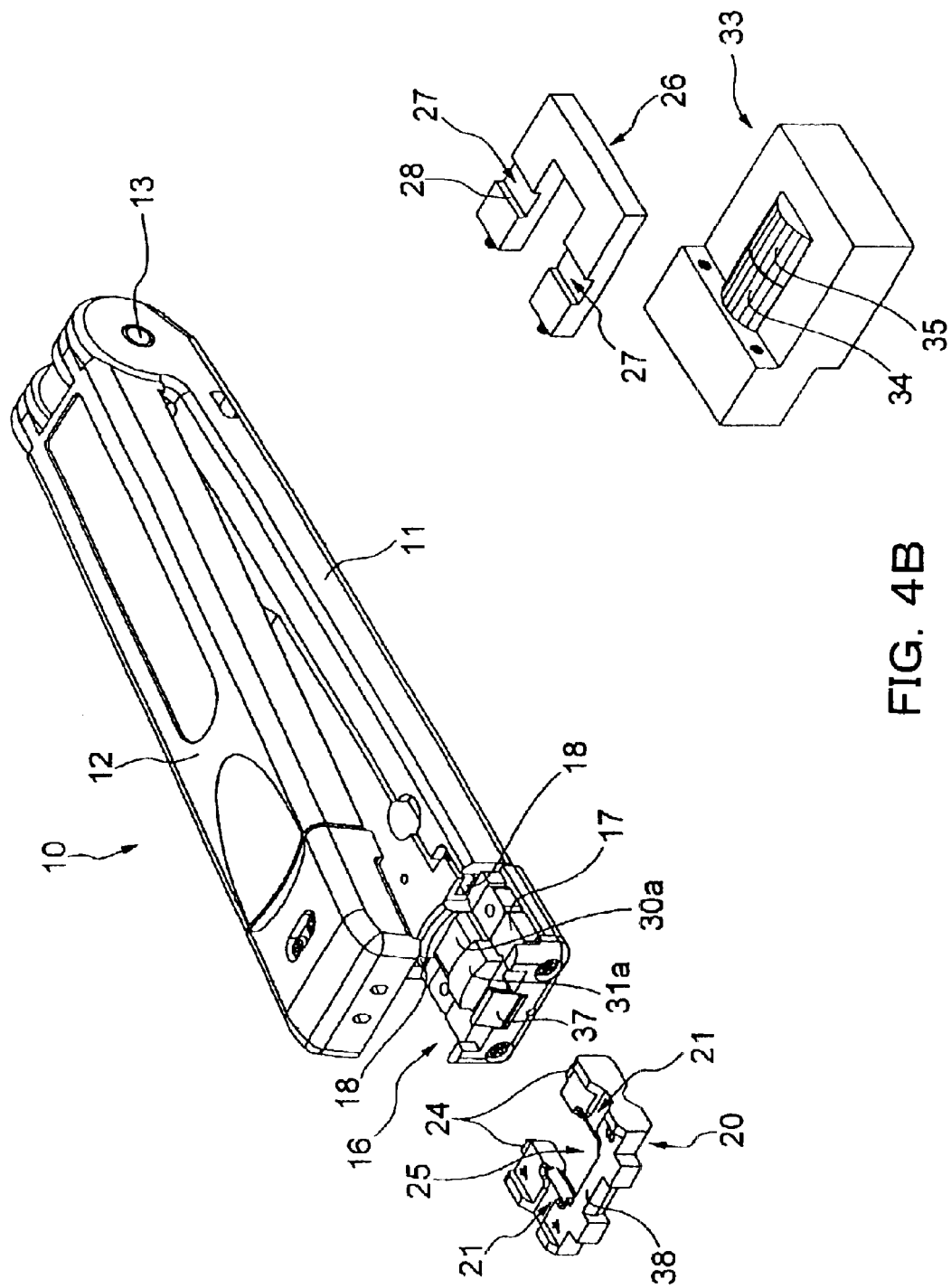
FIG. 4A is a perspective view showing a guide member removed from the splitting tool 10 to explain configurations of the guide member and a guide attachment portion.
FIG. 4B is a perspective view showing a guide member and guide attachment portion according to another embodiment of the present invention.

The guide member 20 will be described with reference to FIGS. 4A and 4B.

The guide groove portion 21 of the present invention are formed on the guide member 20 which is detachable from the splitting tool 10. Therefore, by exchanging various types of guide members 20 with different guide groove portion 21 corresponding to the type of optical fiber ribbon to split, it is possible to split various types of optical fiber ribbons. FIG. 4A is a perspective view showing the guide member 20 removed from the tool 10. The guide member 20 having the guide groove portion 21 is removabley attached to the guide attachment portion 16 provided in the front end portion 15 of the second member 12.

The guide attachment portion 16 includes an attachment platform portion 17, engaging holes 18 and guide fixing portion 37. The guide member 20 is provided with engaging pins 24 that engage in respective engaging holes 18. A cut portion 25 is formed in the center portion of the guide member 20 which separates the guide groove portion into two portions extending rightward and leftward. The cut portion accommodates the fixed member 30a and movable member 31a forming a part of the shear portion. When attaching the guide member 20 to the splitting tool, the member 20 is mounted on the attachment platform portion 17 while the engaging pins 24 of the guide member 20 are inserted into respective engaging holes 18. When the guide member 20 is placed in a predetermined attachment position, the guide fixing portion 37 provided in the splitting tool presses a press engaging portion 38 of the guide member 20, and thereby the guide member 20 is fixed onto the guide attachment portion 16. The guide fixing portion 37 is composed of an elastic material such as a flat spring. It may be possible to fix the guide member 20 to the guide attachment portion 16 using a screw, for example.

Since there are various types of optical fiber ribbons such as 2-fiber, 4-fiber, 8-fiber and 12-fiber, various types of guide members with guide groove portion 21 having different groove widths and depths corresponding to types of optical fiber ribbons are prepared. Thus, the guide members 20 are to be exchanged corresponding to the type of optical fiber ribbon to split, and it is thereby possible to cope with the splitting of the various types of optical fiber ribbons by means of a single splitting tool. FIG. 4B shows an exchangeable guide member 26 and attachment portion 33 according to another embodiment of the present invention. In this embodiment, the guide member 26 has the same guide groove portion 27 as in conventional techniques. In other words, respective side walls 28 of the guide groove portion 27 rise vertically as in conventional techniques. Further, as the shearing pieces, a fixed piece 34 and movable piece 35 in conventional techniques are used in this embodiment.

Further, instead of the fixed members 30a and 30b and movable members 31a and 31b, cutting edges may be provided in respective positions of the above members. In this case, it may be possible to provide the cutting edges in either one or both of the first member 11 and second member 12. For example, a configuration may be possible in which with no cut portion 25 provided in the guide member 20, the grove portion 21 is provided in a position of the cut portion 25 and cutting edges (not shown) projecting downwardly are further provided in respective positions of the fixed member 30b and movable member 31b of the second member 12.

Furthermore, a configuration may be possible for providing cutting edges opposite to the both members. In the splitting, the first member 11 and second member 12 are closed to sandwich an optical fiber ribbon placed in the guide groove portion 21, and thereby, the cutting edges give a cut or slit to the optical fiber ribbon. While keeping the members 11 and 12 closed, moving the optical fiber ribbon or splitting tool relatively splits the optical fiber ribbon by a desired length. According to such a configuration, the exchangeable guide member of the present invention is also applicable to splitting tools using a cutting edge.

(A Method of Preventing the Torsion Caused by Shearing in the Splitting)

A method of preventing the torsion caused by shear splitting will be described. The torsion occurring in the splitting by shearing is due to the sag (extension) caused by applying a shear stress to only one side of an optical fiber ribbon to be split. In other words, only one side in width direction of the split two optical fiber ribbons extends, and thereby the torsion occurs.

Hence, in the present invention, an optical fiber ribbon is extended to project in one direction by a predetermined amount over the entire width of a portion to undergo the shear splitting. The shear stress is subsequently applied in the direction opposite to the projecting direction to split the optical fiber ribbon. Thus, the optical fiber ribbon is first extended in the form of a convex over its entire width, then given the shear stress in the direction for recovering the already extended optical fiber ribbon, and therefore, does not extend any more (the sag does not occur) by the shear stress. Accordingly, since both split portions of the optical fiber ribbon do not change in length, the torsion does not occur.

Figures 5A, 5B:
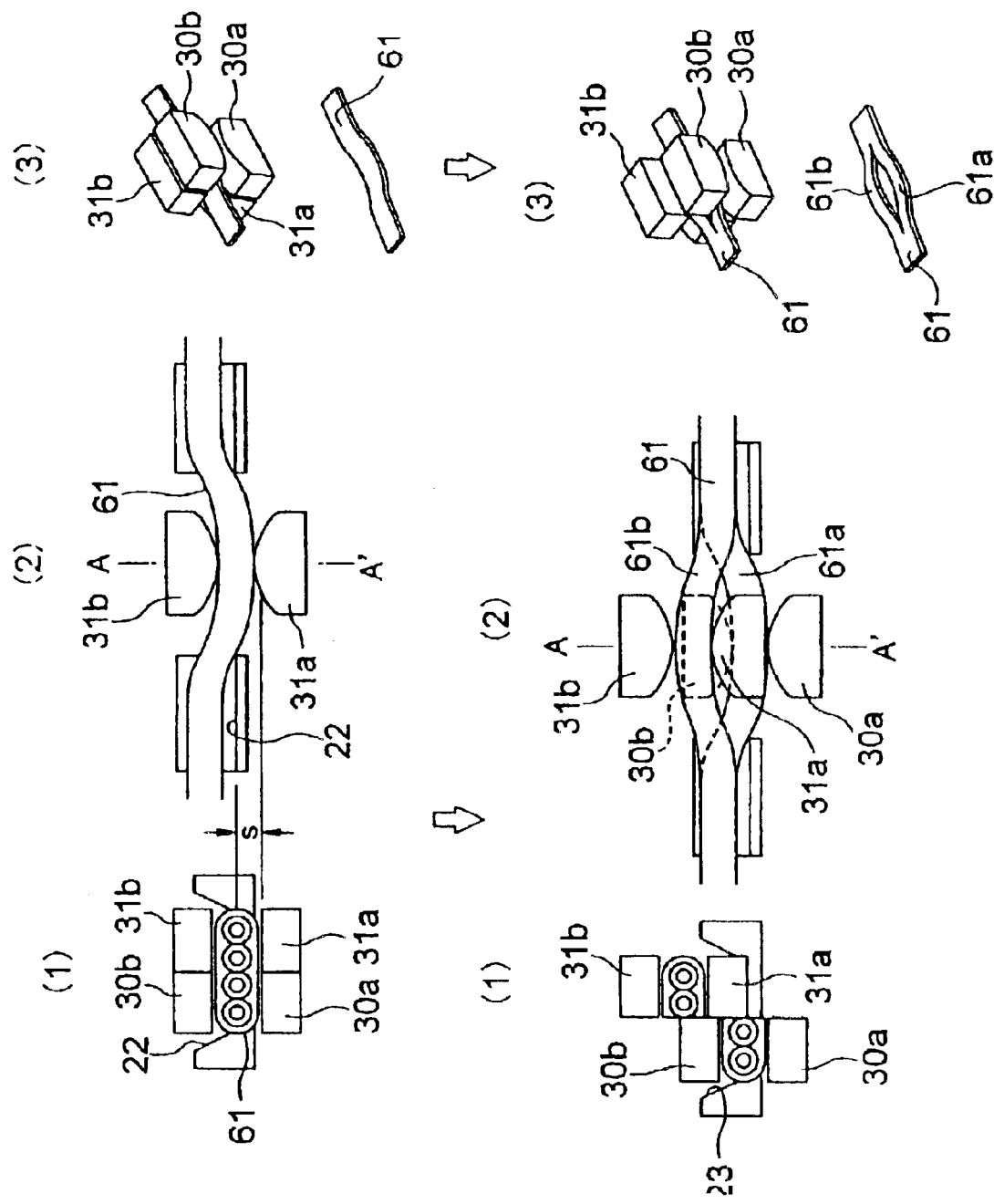
FIGS. 5A and 5B are conceptual views to explain a method and configuration to prevent the torsion caused by shear splitting of the present invention.

The method will be described more specifically with reference to FIGS. 5A and 5B. FIGS. 5A and 5B are conceptual views to explain the method and configuration to prevent the torsion caused by shear splitting. FIG. 5A-(1) is a cross-sectional view in the direction of the width of the optical fiber ribbon illustrating the pair of the fixed members 30a and 30b and the pair of the movable members 31a and 31b which sandwich the tap conductor 61 (cross-sectional view taken along the line A—A' of FIG. 5A-(2)). FIG. 5A-(2) is a cross-sectional view in the direction of the length of the above members. FIG. 5A-(3) is a perspective view illustrating the pair of the fixed members and the pair of the movable members which sandwich the optical fiber ribbon, and the optical fiber ribbon having deformed. FIG. 5B-(1), 5B-(2) and 5B-(3) show a state in which the pair of the movable members 31a and 31b are moved upwardly and the optical fiber ribbon 61 is thereby split by shearing, respectively viewed in the same direction as in FIGS. 5A-(1), 5A-(2) and 5A-(3).

As can be seen from FIGS. 5A and 5B, each of the pair of the fixed members 30a and 30b and the pair of the movable members 31a and 31b is formed in the shape of a convex with gentle slope. The fixed member 30a and movable member 31a of the first member 11, and the fixed member 30b and movable member 31b of the second member 12 sandwich the optical fiber ribbon at a position lower than the bottom portion 22 of the guide groove portion 21 by "s".

When pinching the optical fiber ribbon 61 by the splitting tool configured as described above, as shown in FIGS. 5A-(1) and 5A-(2), the optical fiber ribbon 61 is sandwiched between the vertically arranged pair of the fixed members 30a and 30b as well as between the vertically arranged pair of the movable members 31a and 31b in a position lower than the bottom portion 22 of the guide groove portion 21. Therefore, the optical fiber ribbon 61 extends downwardly in the form of a convex in the entire width due to the form of a convex with gentle slope of each of the fixed members and the movable members. FIG. 5A-(3) shows a perspective view of the optical fiber ribbon 61 thus extending downwardly in the form of a convex.

The optical fiber ribbon 61 as shown in FIGS. 5A-(1) is split by the shear stress caused by upwardly moving the movable members 31a and 31b sandwiching part of the width of the optical fiber ribbon 61. FIGS. 5B-(1) to 5B-(3) show a state after moving the movable members upwardly.

When thus moving only the movable members 31a and 31b upwardly, as shown in FIGS. 5B-(1) and 5B-(2), a boundary portion of the optical fiber ribbon 61 held by the fixed members 30a and 30b and the movable members 31a and 31b is split by shearing. In the shearing, since the shear stress applied to the optical fiber ribbon sandwiched between the movable members serves in the direction in which the extended optical fiber ribbon sags, a sag does not occur due to the extension caused by the shear stress. Accordingly, the torsion in the direction of the width of the optical fiber ribbon does not occur, and it is thereby possible to split the optical fiber ribbon accurately.

(Shapes of the Fixed Members and Movable Members of the Shear Splitting Portion)

In splitting an optical fiber ribbon by a predetermined length, part of the optical fiber ribbon is first split, and the split portion is extended by a required length. The splitting of a part of the optical fiber ribbon and then extending the split portion by a required length is referred to as "extension" in the specification. In conventional techniques, a rod-shaped member is inserted into a split portion, and then the rod-shaped member is moved to extend the split portion.

In the present invention, the split portion is extended by moving the splitting tool in one direction as the tool splits the optical fiber ribbon by shearing. In this case, when each of the cutting edges of the fixed member and the movable member to cut the optical fiber ribbon has a shape with an acute angle, the cutting edges get caught in the optical fiber ribbon in extending the split portion of the optical fiber ribbon, and it is difficult to obtain extension in good condition. Meanwhile, forming cutting edges of the fixed member 30b and the movable member 31a into a shape with an acute angle makes it easier to split the optical fiber ribbon. Therefore, in the present invention, only part of a cutting edge of each of the fixed member 30b and the movable member 31b is formed into a shape with an acute angle, and the chamfering is applied to the other part of the cutting edges.

Figure 6A:
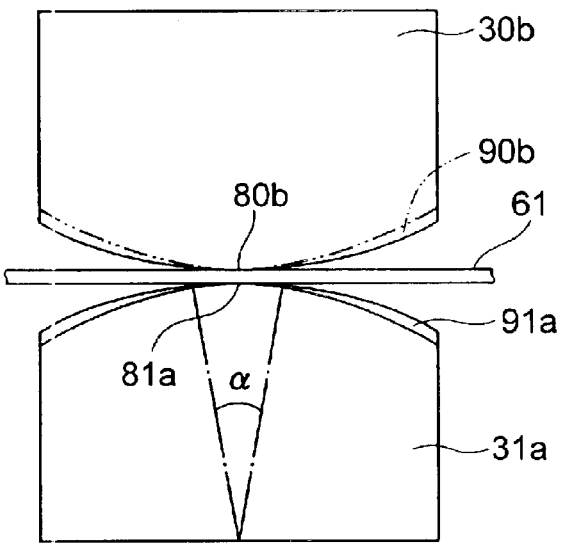
FIG. 6A is a view showing a front view of a shear portion with cutting edges of a fixed member and movable member of the splitting tool 10 immediately before shear splitting.
Figure 6B:
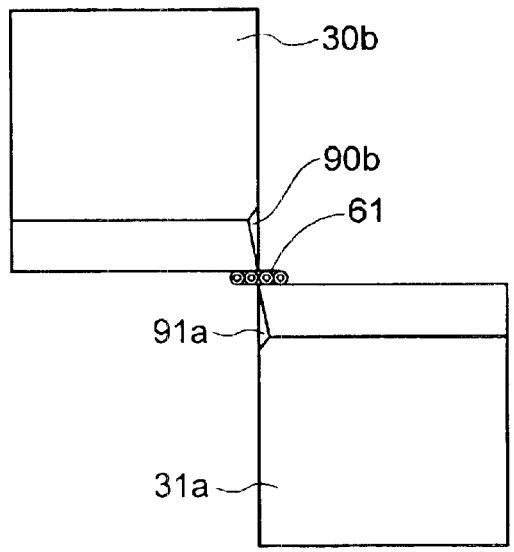
FIG. 6B is a side view of the shear portion.

More description is given with reference to FIGS. 6A to 6E. FIG. 6A shows the optical fiber ribbon 61 (immediately before being shear-split) gently sandwiched between the fixed member 30b and the movable member 31a. To clarify the shape of the movable member 31b, the lower side of the fixed member 30a is omitted. FIG. 6B shows a side view of FIG. 6A. Cutting edges of the fixed member 30b and the movable member 31a are respectively provided with chamfer portions 90b and 91a. Center portions 80b and 81a of the cutting edges have sharp shapes (acute angle) to split an optical fiber ribbon smoothly, and the chamfering is not applied. In addition, while an angle α indicative of a range in which the chamfering is not applied is set arbitrary, it is preferable that α is about 10 degrees.

As can be seen from FIG. 6B, the area of each of the chamfer portions 90b and 91a gradually increases outwardly (sideward in FIG. 6A). Thus, the cutting edges are formed into a sharp shape in respective center portions 80b and 81a and given gradually increased chamfering as being apart from the center portions towards outside, whereby the cutting edges 80b and 81a in the center portions enable shear-splitting on the optical fiber ribbon 61 with excellence, while the chamber portions 90b and 91a enable smooth extension.

Figure 6C:
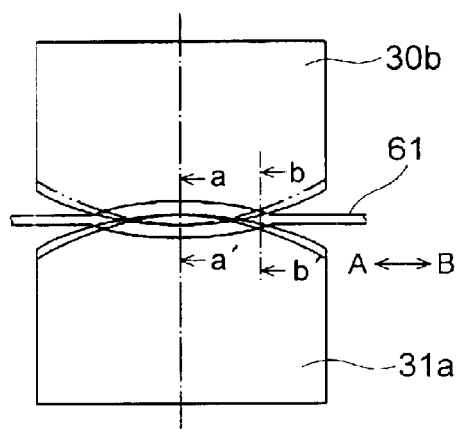
FIG. 6C is a front view of the shear potion immediately after shear splitting.
Figure 6D:
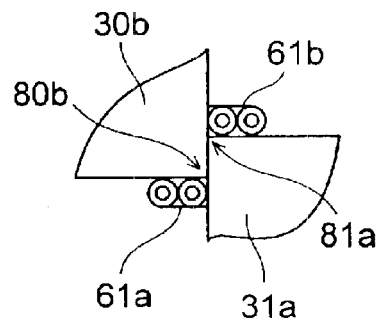
FIG. 6D is a cross-sectional view taken along the line a—a' of FIG. 6C.
Figure 6E:
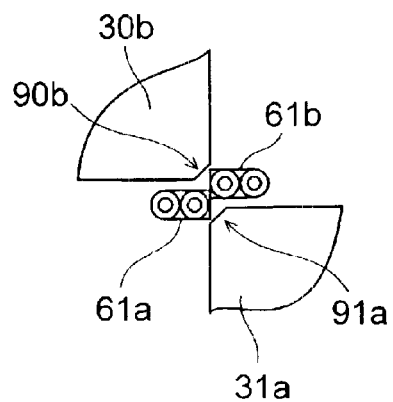
FIG. 6E is a cross-sectional view taken along the line b—b' of FIG. 6C.

More specific description is given with reference to FIGS. 6C to 6E. FIG. 6C is a view showing the optical fiber ribbon 61 shear-split by the fixed member 30b and the movable member 31a. FIG. 6D is a partial cross-sectional view taken along the line a—a' of FIG. 6C, and FIG. 6E is a partial cross-sectional view taken along the line b—b' of FIG. 6C. As shown in FIG. 6D, the optical fiber ribbon 61 is split into optical fiber ribbons 61a and 61b respectively by acute cutting edges 80b and 81a provided at the center portions of cutting edges. Meanwhile, as shown in FIG. 6E, outer portions of cutting edges are provided with chamfer portions 90b and 91a gradually increasing as being apart from the center portion towards outside. Accordingly, when the fixed member 30b and the movable member 31a move in the direction of the arrow A or B in FIG. 6C to extend the split portion, the optical fiber ribbon 61a or 61b is not caught in the cutting edge due to the presence of the chamfer portion 90b or 91a, respectively, and it is thereby possible to extend the split portion smoothly.

The splitting tool according to the present invention will be described specifically with reference to embodiments.

Figure 7A:
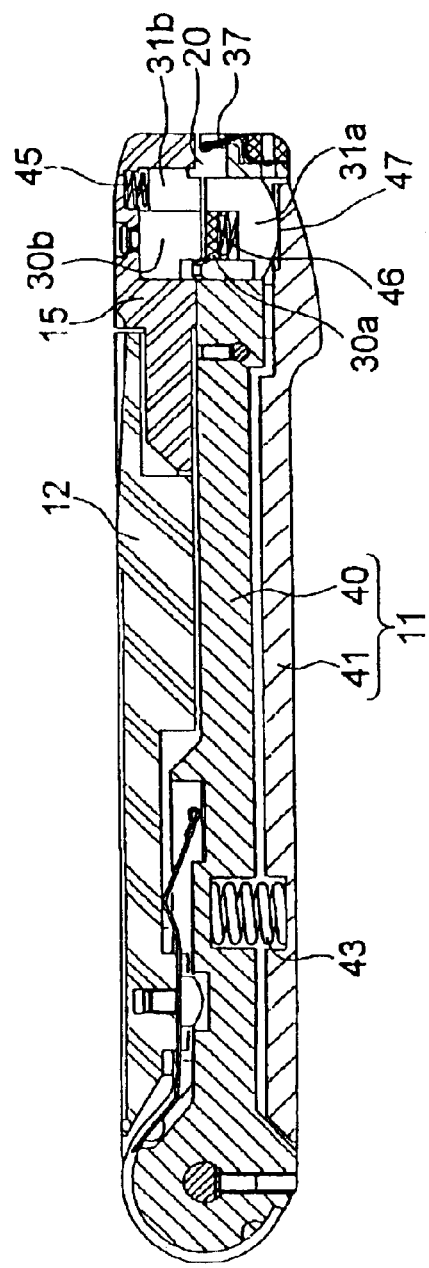
FIG. 7A is a longitudinal sectional center view of the optical fiber ribbon splitting tool 10 according to the first embodiment of the present invention.
Figure 7B:
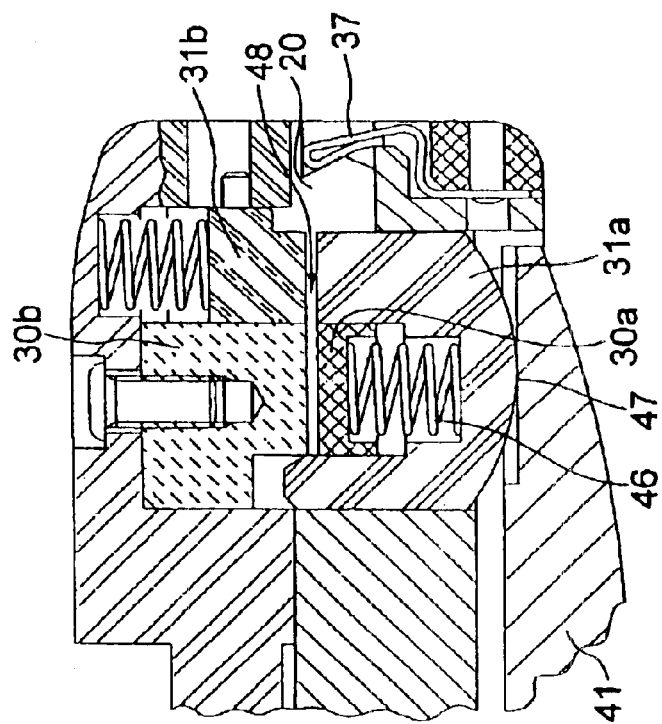
FIG. 7B is a partially enlarged sectional view of a front end portion of the splitting tool 10.

FIGS. 7A and 7B show sectional views of the splitting tool 10 according to the first embodiment of the present invention. For clarity of illustration, hatching is omitted when necessary for a fixing screw, spring, fixed members, movable members, or guide member, or their sectional portions are shifted. FIG. 7A is a longitudinal sectional center view of the splitting tool 10 with the first member 11 and second member 12 closed. FIG. 7B is a partially enlarged sectional view of a front end portion of FIG. 7A.

As can be seen from FIG. 7A, the guide portion 20 is pressed and fixed to the splitting tool by the guide fixing portion 37. The first member comprises a main portion 40 that supports the fixed member 30a and the movable member 31b, and a pressing member 41 for pressing the movable member 31a upwardly. The pressing member 41 is configured to be movable upwardly against the spring 43. The movable members 31a and 31b respectively at lower and upper sides are configured to be movable vertically, and are pressed and fixed downwardly by springs 45 and 46. The movable member 31a is in contact with the pressing member 41 in the pressing portion 47. When pressing the pressing member 41 upwardly, the movable member 31a moves upwardly against the spring 45.

More specific description is given with reference to FIG. 7B. Pressing the pressing member 41 moves the movable member 31a upwardly against the spring 46. Since the fixed member 30a is fixed to the main portion 40 of the first member, while the fixed member 30b is fixed to the second member, the fixed members do not move.

When an optical fiber ribbon is caught in the gap 48 between the fixed members 30a and 30b and between the movable members 31a and 31b respectively at lower and upper sides, pressing the pressing portion 41 moves the movable member 31a upwardly, which presses the movable member 31b also upwardly via the optical fiber ribbon. The movable member 31b thus moves upwardly against the spring 45 while holding the optical fiber ribbon. Meanwhile, the fixed members 30a and 30b are fixed, and so do not move. In this way, since part of the optical fiber ribbon is held by the fixed members while the other part of the optical fiber ribbon moves upwardly being sandwiched between the movable members 31a and 31b, the boundary portion between the fixed members and movable members is split by shearing.

In addition, a position of the gap 48, which is formed by the fixed members and movable members at lower and upper sides to pinch an optical fiber ribbon when the first member 11 and second member 12 are closed, is configured to be lower than the position of the guide groove portion 21. Accordingly, as described previously, the torsion caused by the shear stress is suppressed, and it is thereby possible to perform accurate splitting.

Figure 8A:
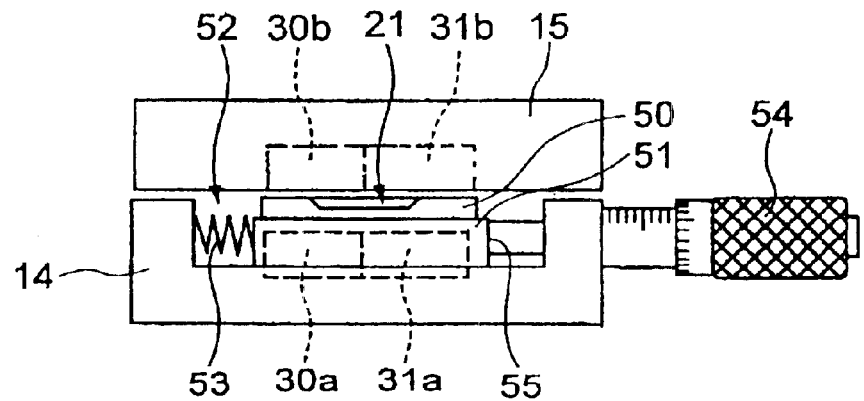
FIG. 8A is a side view showing a guide groove portion 21 viewed from fixed members and movable members according to another embodiment of the present invention.
Figure 8B:
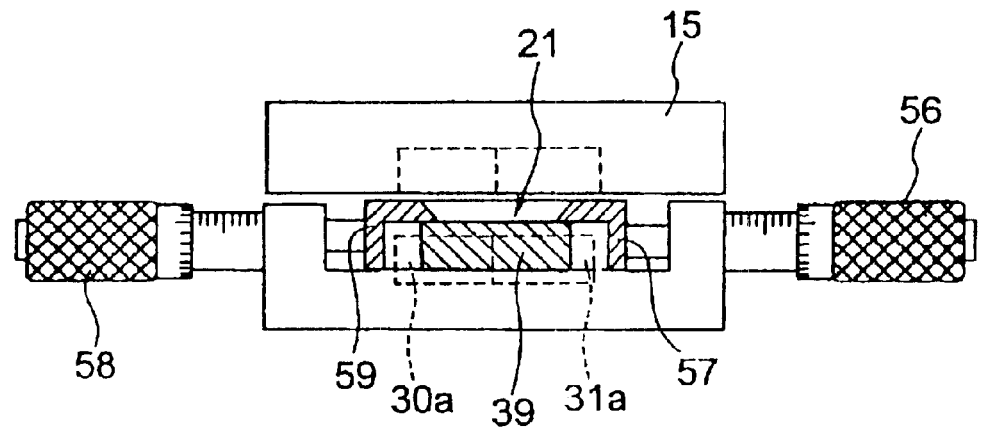
FIG. 8B is a side view showing a guide groove portion 21 viewed from fixed members and movable members according to another embodiment of the present invention.
Figure 9A:
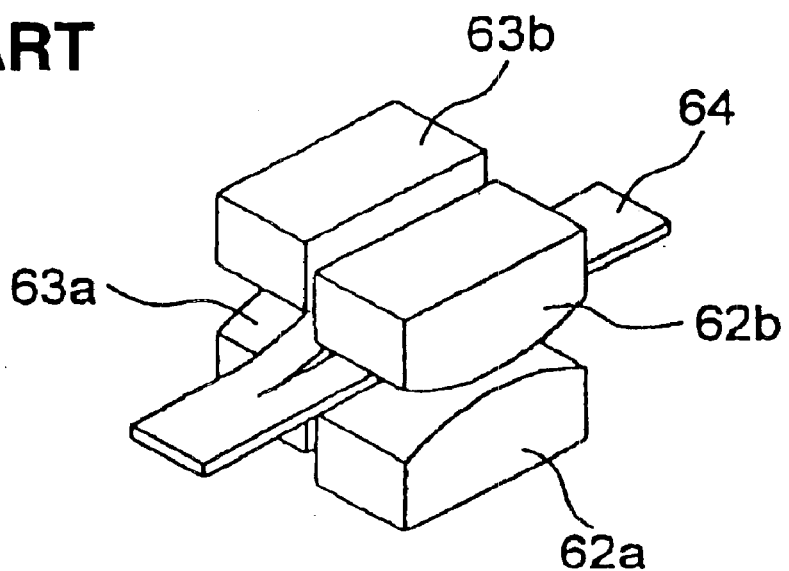
FIGS. 9A and 9B are conceptual views to explain shear splitting according to a conventional technique.
Figure 9B:
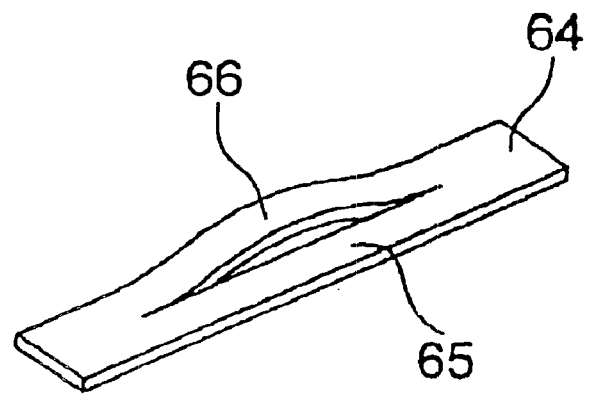

Another embodiment of the guide groove portion will be described below with reference to FIGS. 8A and 8B. FIGS. 8A and 8B show side views of the guide groove portion 21 viewed from the fixed members and movable members. To illustrate a shear position by the fixed members 30a and 30b and movable members 31a and 31b, the fixed members 30a and 30b and movable members 31a and 31b are illustrated by dashed line (the members are actually disposed at a front side of FIGS. 8A and 8B, and do not appear in the figures).

In the embodiment shown in FIG. 8A, a guide platform portion 50 provided with a respective guide groove portion 21 is provided on a position adjusting movable member 51. The position adjusting movable member 51 is provided to be slidable sideward in an adjusting groove 52. The adjusting groove 52 is provided on its one side face with a pressing member 53 composed of an elastic member such as a spring material or elastic rubber, and the pressing member 53 presses the member 51 toward a side of a front end portion 55 of a micro screw 54 at the opposite side of the member 53. Accordingly, the micro screw 54 allows fine adjustment of the position adjusting movable member 51 in either direction depending on the direction of rotation of the screw 54. Examples used as the spring material include a flat spring made of plastic or metal and coil spring.

According to this embodiment, it is made possible to perform fine adjustment of the relative position of the guide groove portion to the fixed and movable members, and to split an optical fiber ribbon precisely. Further, by moving an entire position of the guide groove portion, it is made possible to shift a shear position without changing the width of the guide groove portion, and to change a shear position of an optical fiber ribbon.

FIG. 8B shows another embodiment. This embodiment enables each guide groove portion 21 to change its width. In this embodiment, the guide groove portion 21 is composed of side wall members 57 and 59 forming right and left walls, respectively viewed in the figure, and a bottom member 39 composing the bottom portion. The side wall members 57 and 59 are configured to be slidable on the bottom member 39, and coupled to micro screws 56 and 58 respectively. Accordingly, by rotating the micro screws 56 and 58 rightward or leftward, it is possible to optionally move the side wall members 57 and 59 in either direction of right or left viewed in the figure, and to adjust the width and position of the guide groove portion 21 optionally.

In this way, the split position of an optical fiber ribbon can be changed arbitrarily. There are various types of optical fiber ribbons such as 2-fiber, 4-fiber and 8-fiber. In this embodiment, corresponding to widths of various types of optical fiber ribbons, it is possible to adjust the width of the guide groove portion optionally, and therefore, the single splitting tool is capable of splitting various types of optical fiber ribbons at arbitrary positions.

In addition, while FIGS. 8A and 8B show the case where the adjusting groove portion 52 is provided at the front end portion 14 of the first member 11, it may be possible to provide the guide member 20 with respective portions in FIGS. 8A and 8B when the guide groove portion 21 is provided on the detachable guide member 20.

As described above, in the present invention, since opposite side faces of an optical fiber ribbon are supported by tilt side wall potions, it is possible to eliminate or suppress a gap in the guide groove portion caused by production error in the width of the optical fiber ribbon, enabling precise positioning of the optical fiber ribbon.

Further, the width of the bottom portion of the guide groove is made smaller than the minimum width of the optical fiber ribbon allowable in standards, whereby optical fiber ribbons complying with the standards can be positioned with more accuracy. By thus determining the shape of the guide groove portion according to the allowable minimum width in each standard, it is possible to provide the optical fiber ribbon splitting tool high in versatility.

Furthermore, even the optical fiber ribbon with the standard minimum width is supported assuredly by right and left side wall portions of the guide groove portion.

Still furthermore, it is possible to determine a minimum depth of the guide groove portion for the optical fiber ribbon with the maximum width allowable in standards.

Moreover, exchanging guide members enables a shape of the guide groove portion of the splitting tool to be changed, and thus enables a signal spitting tool to split various types of optical fiber ribbons. This configuration is also applicable to a splitting tool for the splitting by cutting edge.

Further, since two portions to be split are given the sag (extension) to the same extent and not given further sag by shear stress, the torsion does not occur in split optical fiber ribbons.

Moreover, it is possible to extend the split portion of the optical fiber ribbon in one direction smoothly in the entire shear splitting. Further, in the optical fiber ribbon splitting tool, it is possible to provide the guide groove portion with a bottom portion with a width slightly smaller than a width of an optical fiber ribbon to be split, and side wall portions tilting so as to narrow the groove width towards the bottom portion from an opening portion in the guide groove portion. Furthermore, it is possible to provide the optical fiber ribbon splitting tool with an exchangeable guide member having guide groove portion and an attachment engaging portion, and a guide attachment portion that engages in the attachment engaging portion of the guide member and fixes the guide member to the splitting tool in an exchangeable manner.

Further, it is possible to prevent the torsion due to the sag (extension) in only one side of the split portions of the optical fiber ribbon caused by the shear splitting.

As described above, the specification discloses each of various inventions such as a splitting tool provided with guide groove portion enabling an optical fiber ribbon to be positioned in an accurate position even if the optical fiber ribbon has a specified production error, a splitting tool allowing exchange of various guide members provided with different guide groove portion, a splitting tool provided with a splitting portion for giving the sag in one direction to an optical fiber ribbon, shearing and splitting the optical fiber ribbon in the direction opposite to the sage and thereby enabling the shearing while preventing the torsion, and a splitting method enabling shear splitting while preventing the torsion.

However, it may be possible to construct not only an optical fiber ribbon splitting tool provided with the guide groove portion, guide member, shear splitting portion or the like, but also an optical fiber ribbon splitting tool provided with combined above portions. It is thereby possible to provide a splitting tool with combined excellent effects of the portions and members.

As described above, in the splitting tool according to one embodiment of the present invention, the width of the bottom portion of the guide groove is made less than the standard minimum value of the width of an optical fiber ribbon, and side wall portions are provided to tilt so as to narrow a distance between the side wall portions towards the bottom portion. In this way, it is possible to position an optical fiber ribbon in a center portion of the guide groove portion. Further, in the splitting tool according to another embodiment, since the guide member provided with the guide groove portion is configured to be exchangeable, it is possible to split various types of optical fiber ribbons with a single main portion and various guide members with different guide groove portion corresponding to the types of optical fiber ribbons.

Further, in the splitting tool according to another embodiment, the predetermined sag in the form of a convex is given to an optical fiber ribbon in one direction and a shear stress is applied to the optical fiber ribbon in the direction opposite to the sag to split the optical fiber ribbon, thereby preventing the torsion in the optical fiber ribbon caused by the shear stress. In this way the satisfactory splitting is made possible. Furthermore, in the splitting tool according to another embodiment, it is possible to extend the split portion by moving the shear portion, thus eliminating the need of a tool for split extension.

Moreover, according to the splitting tool according to another embodiment of the present invention, a simple configuration is available in which an optical fiber ribbon is sandwiched vertically and split by shearing, and the split portion is extended by moving the splitting tool with the optical fiber ribbon sandwiched, enabling a miniaturized splitting tool. Further, by making the guide groove portion exchangeable according to the type, size or the like of an optical fiber ribbon, it is possible to provide a miniaturized splitting tool allowing splitting of various types of optical fiber ribbons.

What is claimed is:

1. An optical fiber ribbon splitting tool that accommodates an optical fiber ribbon in a guide groove portion and splits longitudinally an accommodated optical fiber ribbon, wherein a cross section of said guide groove portion comprises a bottom portion with a width slightly smaller than a width of the optical fiber ribbon to be split, and side wall portions each composed of a straight-slant surface tilting in such a manner that a groove width becomes narrower as closer to said bottom portion from an opening portion in said guide groove portion.

2. The optical fiber ribbon splitting tool of claim 1, wherein the width of said bottom portion of said guide groove portion is smaller than a standardized minimum width of an optical fiber ribbon, and said slant surface of each of said side wall portions has an angle smaller than 90° to said bottom portion.

3. The optical fiber ribbon splitting tool of claim 2, wherein a width x of said bottom portion of said guide groove portion is smaller than a value determined from Equation (1) described below:

$$x = Wa - 2\left(\frac{t}{2} - \frac{t}{2}\tan\left(\frac{\beta}{2}\right)\right) \qquad \text{[Eq. 1]}$$

where the standardized minimum width of an optical fiber ribbon is Wa, a thickness of the optical fiber ribbon is t, and the angle of said slant surface of each of said side wall portions is β.

4. The optical fiber ribbon splitting tool of claim 1, wherein a depth y of said guide groove portion is determined from Equation (2) described below:

$$y = \frac{Wb - Wa}{2} \times \tan\beta + t \qquad \text{[Eq. 2]}$$

where a standard maximum width in an optical fiber ribbon is Wb, the standardized minimum width is Wa, a thickness of the optical fiber ribbon is t, and the angle of said slant surface of each of said side wall portions is β.

5. An optical fiber ribbon splitting tool that splits longitudinally an optical fiber ribbon, said tool comprising:
   a guide member which is separable from said splitting tool and has a guide groove portion that accommodates the optical fiber ribbon and an attachment engaging portion; and
   a guide attachment portion which is provided in said splitting tool, engages in said attachment engaging portion of said guide member and thereby fixes said guide member to said splitting tool in an exchangeable manner.

6. The optical fiber ribbon splitting tool of claim 5, wherein said guide member has a cut portion formed crossing over a part of said guide groove portion which separates said guide groove portion into two portions, and when said guide member is attached and fixed to said splitting tool, a shear splitting portion that splits said optical fiber ribbon is accommodated in said cut portion.

7. An optical fiber ribbon splitting tool that sandwiches an optical fiber ribbon vertically and splits the optical fiber ribbon by shear stress along a longitudinal direction, said tool comprising:
   guide groove portion that accommodate the optical fiber ribbon to be split; and
   a shear splitting portion comprising a pair of fixed members which are vertically provided in a cut portion formed so as to separate said guide groove portion into two portions and sandwich vertically therebetween a part of the optical fiber ribbon in a width direction at a position lower than a bottom portion of said guide groove portion and hold said conductor at said position, and a pair of movable members which are vertically provided adjacent to said fixed members in said cut portion, sandwich vertically therebetween a remaining part of the optical fiber ribbon in a width direction at the same position as said fixed members to be held, and when pressed by force more than a predetermined level, move upwardly while holding said part of the optical fiber ribbon in the width direction.

8. The optical fiber ribbon splitting tool of claim 7, wherein at least upper fixed member of said pair of fixed members and at least upper movable member of said pair of movable members have respective curved surfaces each with a convex-shaped cross section projecting downwardly.

9. The optical fiber ribbon splitting tool of claim 7, wherein a cross section of said guide groove portion comprises a bottom portion with a width slightly smaller than a width of the optical fiber ribbon to be split, and side wall portions each composed of a straight-slant surface tilting in such a manner that a groove width becomes narrower as closer to said bottom portion from an opening portion in said guide groove portion.

10. The optical fiber ribbon splitting tool of claim 9, wherein the width of said bottom portion of said guide groove portion is smaller than a standardized maximum width of an optical fiber ribbon, and said slant surface of each of said side wall portions has an angle smaller than 90° to said bottom portion.

11. The optical fiber ribbon splitting tool of claim 10, wherein a width x of said bottom portion of said guide groove portion is smaller than a value determined from Equation (1) described below:

$$x = Wa - 2\left(\frac{t}{2} - \frac{t}{2}\tan\left(\frac{\beta}{2}\right)\right) \quad \text{[Eq. 1]}$$

where the standardized minimum width of an optical fiber ribbon is Wa, a thickness of the optical fiber ribbon is t, and the angle of said slant surface of each of said side wall portions is β.

12. The optical fiber ribbon splitting tool of claim 11, wherein a depth y of said guide groove portion is determined from Equation (2) described below:

$$y = \frac{Wb - Wa}{2} \times \tan\beta + t \quad \text{[Eq. 2]}$$

where a standard maximum width in an optical fiber ribbon is Wb, the standardized minimum width is Wa, a thickness of the optical fiber ribbon is t, and the angle of said slant surface of each of said side wall portions is β.

13. The optical fiber ribbon splitting tool of claim 7, further comprising:
   a guide member which is separable from said splitting tool and has a guide groove portion and an attachment engaging portion; and
   a guide attachment portion which is provided in said splitting tool, engages in said attachment engaging portion of said guide member and thereby fixes said guide member to said splitting tool in an exchangeable manner.

14. The optical fiber ribbon splitting tool of claim 13, wherein said guide member has a cut portion formed crossing over a part of said guide groove portion which separates said guide groove portion into two portions, and when said guide member is attached and fixed to said splitting tool, a shear splitting portion that splits said optical fiber ribbon is accommodated in said cut portion.

15. A method of splitting longitudinally part of an optical fiber ribbon, comprising the steps of:
   (a) sandwiching the optical fiber ribbon and thereby applying a stress in one direction so as to provide a portion of the optical fiber ribbon to be split by shearing with a sag portion in said one direction; and
   (b) applying a shear stress in a direction opposed to said one direction to the portion of the optical fiber ribbon with the sag portion provided, and splitting a part of the optical fiber ribbon in a width direction by shearing.

* * * * *